United States Patent
Karlsson (10) Patent No.: US 12,375,827 B2
(45) Date of Patent: Jul. 29, 2025

(54) BACKGROUND LIGHT SUBTRACTION FOR INFRA-RED IMAGES

(71) Applicant: Axis AB, Lund (SE)

(72) Inventor: Jenny Karlsson, Lund (SE)

(73) Assignee: AXIS AB, Lund (SE)

( * ) Notice: Subject to any disclaimer, the term of this patent is extended or adjusted under 35 U.S.C. 154(b) by 37 days.

(21) Appl. No.: 18/414,910

(22) Filed: Jan. 17, 2024

(65) Prior Publication Data
US 2024/0259691 A1    Aug. 1, 2024

(30) Foreign Application Priority Data

Jan. 31, 2023   (EP) ..................................... 23154105

(51) Int. Cl.
*H04N 25/531*   (2023.01)
*G06V 10/143*   (2022.01)
(Continued)

(52) U.S. Cl.
CPC ......... *H04N 25/531* (2023.01); *G06V 10/143* (2022.01); *G06V 20/54* (2022.01); *G06V 20/625* (2022.01); *H04N 23/11* (2023.01); *H04N 23/20* (2023.01); *H04N 23/21* (2023.01); *H04N 23/23* (2023.01); *H04N 23/56* (2023.01); *H04N 23/71* (2023.01); *H04N 23/72* (2023.01);
(Continued)

(58) Field of Classification Search
CPC .. H04N 25/587; H04N 25/531; H04N 25/131; H04N 23/56; H04N 23/11; H04N 23/20; H04N 23/21; H04N 23/23
See application file for complete search history.

(56) References Cited

U.S. PATENT DOCUMENTS

| | | |
|---|---|---|
| 10,136,076 B2 | 11/2018 | Tanaka et al. |
| 11,196,937 B2 | 12/2021 | Yao et al. |

(Continued)

FOREIGN PATENT DOCUMENTS

| | | |
|---|---|---|
| CN | 213637953 U | 7/2021 |
| CN | 111526303 B | 5/2022 |

(Continued)

OTHER PUBLICATIONS

Wan, G., et al., "CMOS Image Sensors With Multi-Bucket Pixels for Computational Photography," in IEEE Journal of Solid-State Circuits, (2012).

(Continued)

*Primary Examiner* — David N Werner
(74) *Attorney, Agent, or Firm* — Volpe Koenig

(57) ABSTRACT

A method of performing background light subtraction in an infra-red (IR) illuminated image depicting a scene, comprises: providing a rolling shutter image sensor; providing an IR light source configured to be turned on and off; changing an on-off status of the IR light source a plurality of times while capturing an image; capturing two or more image frames each image frame comprising: a first set of lines of pixels comprising image data captured with the IR light turned on; a second set of lines of pixels comprising image data captured with the IR light turned off; creating an IR-illuminated image; creating a non-IR-illuminated image; subtracting background light from the IR-illuminated image using pixel values in the non-IR-illuminated image.

12 Claims, 6 Drawing Sheets

(51) Int. Cl.
    *G06V 20/54*     (2022.01)
    *G06V 20/62*     (2022.01)
    *H04N 23/11*     (2023.01)
    *H04N 23/20*     (2023.01)
    *H04N 23/21*     (2023.01)
    *H04N 23/23*     (2023.01)
    *H04N 23/56*     (2023.01)
    *H04N 23/71*     (2023.01)
    *H04N 23/72*     (2023.01)
    *H04N 23/73*     (2023.01)
    *H04N 23/74*     (2023.01)
    *H04N 23/76*     (2023.01)
    *H04N 25/131*    (2023.01)
    *H04N 25/587*    (2023.01)

(52) U.S. Cl.
    CPC ............ *H04N 23/73* (2023.01); *H04N 23/74* (2023.01); *H04N 23/76* (2023.01); *H04N 25/131* (2023.01); *H04N 25/587* (2023.01)

(56) References Cited

U.S. PATENT DOCUMENTS

| | | |
|---|---|---|
| 11,375,174 B2 | 6/2022 | Banks et al. |
| 2010/0019151 A1 | 1/2010 | Shimizu |
| 2013/0307951 A1* | 11/2013 | Ono .................... H04N 23/741 348/68 |
| 2016/0227138 A1* | 8/2016 | Kozlowski ............ H10F 39/809 |
| 2017/0142383 A1* | 5/2017 | Oka ..................... H04N 9/3185 |
| 2017/0251151 A1* | 8/2017 | Hicks ................... H04N 25/531 |
| 2020/0154024 A1 | 5/2020 | Watson et al. |
| 2021/0182582 A1 | 6/2021 | Tsai et al. |
| 2021/0329159 A1 | 10/2021 | Zhao et al. |
| 2022/0247980 A1* | 8/2022 | Fan ..................... H04N 25/587 |

FOREIGN PATENT DOCUMENTS

| | | |
|---|---|---|
| EP | 2448251 A2 | 5/2012 |
| EP | 2448251 A3 | 10/2015 |
| EP | 2938065 A | 10/2015 |
| EP | 2519001 B1 | 6/2019 |

OTHER PUBLICATIONS

Extended European Search Report issued on Jun. 16, 2023 for European Patent Application No. 23154105.3.

* cited by examiner

BACKGROUND LIGHT SUBTRACTION FOR INFRA-RED IMAGES

FIELD OF INVENTION

The present disclosure generally relates to background light subtraction in an infra-red (IR) image depicting a scene, and more specifically to background light subtraction in an IR image using a non-IR image, where both images being captured by a rolling shutter image sensor.

TECHNICAL BACKGROUND

Infra-red (IR) images can be advantageous in a variety of situations where visual information is not sufficient to detect or analyse objects or phenomena. A common example includes night-time or low-light conditions where IR cameras can capture images in the dark, making them useful for monitoring applications, search and rescue, and other applications that require visibility in low-light environments. One example includes using a camera with infra-red lights to read license plates, road signs or detect traffic cones in low-light conditions. License plates, road signs and traffic cones are typically made of reflecting material such as a retroreflector and return much IR-light. However, a problem is that strong light sources in the captured scene, such as headlights of a vehicle, can be directed into the camera and cause scattering and reflexes that cover the object to be detected and makes it hard for analytics software to find and analyse the object (e.g., reading the license plate, determining content in road sign, etc.).

One common solution is to use an optical bandpass filter that only lets through the IR-wavelength of the camera. A downside of this solution may be that the camera is harder to align and focus since there is less light in the image overall, the camera is completely dependent on functioning IR-lights since the camera cannot capture any other light, and the hardware components (the filter including any mechanism to switch it on and off) increase the manufacturing cost of the camera.

Another existing solution, overcoming the above discussed problems, includes syncing the IR-lights on the camera with the frame capture of the sensor of the camera. The IR-lights are switched on for one full frame, and then off for the next full frame. The image without IR is subtracted from the image with IR. Running the sensor at a high frame rate, for example 60 fps, makes it possible to capture video in half that frame rate, 30 fps, with background light subtracted from the IR-image. However, a problem with this solution is if the camera moves (e.g., a camera in a car) or if the scene moves (e.g., the scene includes a road), then the time difference between capturing of the two images only allows movements (objects in the scene and/or the camera) at a low speed (depending on zoom level, and application specific requirements for e.g., level of details, etc.) for the background light subtraction to work sufficiently well.

There is thus a need for improvements in this context.

SUMMARY

In view of the above, solving or at least reducing one or several of the drawbacks discussed above would be beneficial, as set forth in the attached independent patent claims.

According to a first aspect of the present disclosure, there is provided method of performing background light subtraction in an infra-red (IR) image depicting a scene, the method comprising:

providing a rolling shutter image sensor with a plurality of lines of pixels, wherein the rolling shutter image sensor during capture of an image reads out pixel data from one line of pixels at a time;

providing an IR light source configured to be turned on and off, wherein when being turned on, the IR light is configured to illuminate the scene;

changing an on-off status of the IR light source a plurality of times while capturing an image with the rolling shutter image sensor;

capturing two or more image frames using the rolling shutter image sensor, wherein the rolling shutter image sensor being configured to read out image data to the two or more image frames interleaved in time, each image frame comprising:

a first set of lines of pixels comprising image data captured with the IR light turned on;

a second set of lines of pixels comprising image data captured with the IR light turned off;

The method further comprises creating an IR-illuminated image based at least in part on the first set of lines of the two or more image frames and creating a non-IR-illuminated image based at least in part on the second set of lines of the two or more image frames.

The method further comprises subtracting background light from the IR-illuminated image using pixel values in the non-IR-illuminated image, thereby creating a modified IR-illuminated image.

A rolling shutter image sensor is a type of image sensor that captures images by scanning the scene progressively, row by row or column by column, rather than all at once. This means that the image is not captured all at once, but rather is constructed from a series of individual scan lines. The advantage of a rolling shutter is that it allows for faster image capture rates. Typically, a rolling shutter image sensor is used to capture high dynamic range (HDR) images, where the rolling shutter image sensor can be used to capture a series of images with different exposures (e.g., one image with a short exposure time and one image with a long exposure time) in rapid succession, which can then be combined to create an HDR image. However, the rolling shutter image sensor may be configured such that a first and second image is captured with the same or similar exposure time. This makes it possible to allow for movements of the camera or the objects in the scene at a velocity substantially higher compared to the case when the IR-lights are switched on for one full frame, and then off for the next full frame. Examples of a rolling shutter image sensor comprises sensors manufactured by Sony and Omnivision, such as CMOS image sensors supporting a DOL WDR (digital overlap wide dynamic range) function.

By the term "interleaved in time", should, in the context of present specification, be understood that lines of pixels for a second image frame is read out prior to the last lines of pixels to a first image frame is read out. The rolling shutter readout is thus staggered (row interleaved) so that the readout of a line of pixels in the second image frame may start immediately after or very soon after readout the corresponding line of pixels in the first image frame.

By changing an on-off status of the IR light a plurality of times while capturing an image with the rolling shutter image sensor, each image of the at least two images will comprise lines of pixels captured with the IR light turned on, and a lines of pixels captured with the IP light turned off. Advantageously, the on-off cycle of the IR light can be synchronized with the exposure time and the time difference between the two and more captured images, making it possible to stitch an IR-illuminated image comprising (mostly or only) image data captured with the IR light turned on from the first set of lines of pixels in the respective captured image. Similarly, it may be possible to stich a non-IR-illuminated image comprising (mostly or only) image data captured with the IR light turned off from the second set of lines of pixels in the respective captured image.

The difference in capturing time of the IR-illuminated image and the non-IR-illuminated image may thus be small enough to allow for subtraction of background light from the IR illuminated image using pixel values in the non-IR-illuminated image, even if movements of the camera and/or the objects in the scene are substantial.

By the term "background light", should, in the context of present specification, be understood any light in an image that negatively affects detection and analysis of objects being of interest in the image. The background light may result from natural sources such as the sun or the moon, but typically the background light results from bright artificial sources of light such as headlights of a vehicle, spotlights, streetlights, etc, causing adverse reflections and scattering in the image.

Typically, the non-IR-illuminated image and the IR-illuminated image may have the same resolution, which simplifies subtraction since the pixel value of a pixel at coordinate (X, Y) in the non-IR illuminated image may be subtracted from the pixel value of the pixel at the same coordinate (X, Y) in the IR-illuminated image, otherwise, necessary scale transforms of the coordinate space in one of the image may be needed. In case the IR-illuminated image and the non-IR illuminated image is captured using the same colour space, such as for example grayscale, RGB, CMYK etc, subtraction may be performed directly using element-wise arithmetic. In case different colour spaces are used, such as the IR illuminated image being captured in grayscale whereas the non-IR-illuminated image being captured in RGB, necessary transforms of the colour space of one or both of the images may be needed before performing the subtraction (for example transforming the RGB image, and optionally the grayscale image, to the LAB colour space before performing the subtraction).

In some examples, the step of subtracting comprises, for each pixel coordinate of at least a sub-set of pixel coordinates in the non-IR-illuminated image, subtracting the pixel value at the pixel coordinate in the non-IR-illuminated image from the pixel value at a corresponding pixel coordinate in of the IR-illuminated image.

Advantageously, this may increase details and sense of faithfulness in the modified IR illuminated image since areas of the image not affected by e.g., strong headlights need not to be modified as described herein.

In some examples, the sub-set of pixel coordinates is selected based on luminosity (lightness, etc.) of the pixel values in the non-IR-illuminated image. In these examples, the method thus comprises the step of selecting the sub-set of pixel coordinates based on luminosity of the pixel values in the non-IR-illuminated image. For example, if a luminosity of a pixel at (X, Y) (e.g., lightness in the LAB colour space, or value in the grayscale colour space) exceeds a threshold luminosity (e.g., 80, 90 or any other suitable threshold in the LAB colour space, or e.g., 200, 215 or any other suitable threshold in the grayscale colour space), the pixel coordinate (X, Y) is included in the sub-set, and otherwise not.

In some embodiments, the step of subtracting comprises, for each pixel coordinate of at least a sub-set of pixel coordinates in the non-IR-illuminated image, multiplying the pixel value at the pixel coordinate in the non-IR-illuminated image with a weight value, and subtracting the weighted pixel value at the pixel coordinate in the non-IR-illuminated image from the pixel value at a corresponding pixel coordinate in the IR-illuminated image. In examples, subtracting a fraction (such as 10%, 50%, 60%, etc.) of the background light result in that less noise may be added to the modified IR-illuminated image compared to the case where the full background light of the non-IR-illuminated image is subtracted. Advantageously, the present embodiment allows for subtraction of different fractions of the background intensity, such that the of the amount of background subtracted and the amount of noise added may be optimized for each scene.

In some embodiments, the step of capturing two or more image frames comprises capturing a first image frame and a second image frame. In such embodiments, it is advantageous to synchronize the on-off cycle of the IR-lights with the time difference of the first and second image such that the lines of pixels in the first image that is captured with the IR light on, to as large extent as possible, correspond to lines of pixels in the second image captured without IR light off and vice versa. This can be achieved by the step of continuously changing an on-off status of the IR light comprising completing an on-off cycle of the IR light during a first time span, tspan, wherein the IR light is turned on during a first half of the time span and turned off during a second half of that time span. Then, readout of lines of pixels to the two images can be implemented such that, for the first image, the rolling shutter image sensor reads out a first line of pixels at a first point in time, t, and for the second image, the rolling shutter image sensor reads out the first line of pixels at $$t + \frac{t_{span}}{2}.$$

This pattern may then be kept for all lines of pixels in the first and second image, such that a line of pixels in the second image are read out at a point in time that is 0.5 tspan after the corresponding lines of pixels was read out for the first image.

The exposure time for each line of pixels may be less than 0.5 milliseconds. Even if that is a short exposure time, it still means that some lines of pixels will be exposed with both IR-light on and off. To avoid or limit these lines in the IR-illuminated image and in the non-IR-illuminated image, advantageously, some embodiments comprise capturing a third image frame. Then, readout of lines of pixels to the three images can be implemented such that, for the first image, the rolling shutter image sensor reads out a first line of pixels at a first point in time, t. For the second image, the rolling shutter image sensor reads out the first line of pixels at $$t + \frac{t_{span}}{3},$$

and for the third image, the rolling shutter image sensor reads out the first line of pixels at $$t + \frac{2 \times t_{span}}{3}.$$

It should be noted that $t_{span}$ (i.e., the time span for completing an on-off cycle of the IR light) in the three-image setup may be the same as $t_{span}$ in the two-image setup or it may be different. This pattern may then be kept for all lines of pixels in the first, second and third image, such that a line of pixels in the second image always are read out at a point in time that is 0.33 tspan after the corresponding lines of pixels was read out for the first image and such that a line of pixels in the third image always are read out at a point in time that is 0.66 tspan after the corresponding lines of pixels was read out for the first image. Consequently, line data from the first, second, and third exposures may be interleaved in time.

In some embodiments, involving capturing a first and a second image, tspan may be at least 2 times the exposure time of any line of pixels in the two or more image frames. Consequently, a line of pixels has been exposed and read out in the first image before the corresponding line of pixels is exposed and read out in the second image. It should be noted that tspan in some embodiments are anywhere between 2-4 times the exposure time. In the two frames embodiment, a longer time span may result in fewer regions with lines of pixels exposed with both IR-light on and off. A longer time span will result in a larger time separation between the frames, which may suffice when movements of the camera or an object in the scene is not as high, or when the requirements of level of details in images capturing the scene is not as high.

In some embodiments, involving capturing a first, a second and a third image, tspan may be set up such that $$\frac{t_{span}}{2} => 3$$

times the exposure time of any line of pixels in the three image frames. In this embodiment, the IR-illuminated image may be created using only lines of pixels that are exposed with the IR-light on. Furthermore, the non-IR-illuminated image may be created using only lines of pixels that are exposed with the IR-light off.

In some embodiments, the method comprises an initial step of determining a luminosity value of natural light in the scene, wherein, upon determining that the luminosity value exceeds a threshold luminosity, the method is aborted, and upon determining that the luminosity value does not exceed a threshold luminosity, the method is continued. Accordingly, the IR-lights are only used when it is not enough natural light present in the scene to capture details using only the natural light as illumination.

In some examples, the rolling shutter image sensor is configured to have a same exposure time for all lines of pixels. This reduces complexity and simplifies the process of creating the IR-illuminated image and the non-IR-illuminated image.

In some examples, the rolling shutter image sensor is provided in a camera capturing a scene comprising a road. As mentioned above, the present disclosure enables background subtraction even when the scene changes rapidly. An example is a traffic scenario. In some examples, the method further comprises the step of detecting a license plate in the modified IR illuminated image. Identifying license plates may advantageously be done using IR-illumination, since a license plate may be a retro reflector and returns a lot of IR light. Consequently, license plate detection may advantageously be implemented with background subtraction according to the present disclosure.

According to a second aspect of the disclosure, the above object is achieved by a system comprising: a rolling shutter image sensor with a plurality lines of pixels, wherein the rolling shutter image sensor during capture of an image reads out pixel data from one line of pixels at a time; an IR light configured to be turned on and off, wherein when being turned on, the IR light is configured to illuminate the scene; an IR light controlling unit configured to changing an on-off status of the IR light a plurality of times while capturing an image with the rolling shutter image sensor.

The rolling shutter image sensor may be configured for capturing two or more image frames, wherein the rolling shutter image sensor being configured to read out image data to the two or more image frames interleaved in time, each image frame comprising: a first set of lines of pixels comprising image data captured with the IR light turned on; a second set of lines of pixels comprising image data captured with the IR light turned off.

The system may further comprise an image stitching unit configured to: create an IR-illuminated image based at least in part on the first set of lines of the two or more image frames; create a non-IR-illuminated image based at least in part on the second set of lines of the two or more image frames; and subtract background light from the IR-illuminated image using pixel values in the non-IR-illuminated image, thereby creating a modified IR-illuminated image.

According to examples, the system further comprises an image analysis unit configured to detect a license plate in the modified IR illuminated image.

According to a third aspect of the disclosure, the above object is achieved by a non-transitory computer-readable storage medium having stored thereon instructions for implementing the method according to the first aspect when executed on a device having processing capabilities.

The second and third aspects may generally have the same features and advantages as the first aspect. It is further noted that the disclosure relates to all possible combinations of features unless explicitly stated otherwise.

BRIEF DESCRIPTION OF DRAWINGS

The above, as well as additional objects, features, and advantages of the present disclosure, will be better understood through the following illustrative and non-limiting detailed description of embodiments of the present disclosure, with reference to the appended drawings, where the same reference numerals will be used for similar elements, wherein.

DETAILED DESCRIPTION

The present disclosure will now be described more fully hereinafter with reference to the accompanying drawings, in which embodiments of the disclosure are shown. The systems, devices and modules disclosed herein will be described during operation.

The present disclosure relates to the field of background light subtraction.

As discussed above, in situations where visual information is not sufficient, e.g., at night-time or in other low-light conditions, IR-images may advantageously be used to detect and analyse objects in a scene. However, in case the scene depicted in the IR-image comprises one or more strong light sources, such as streetlamps, car headlights, etc., these may cause scattering and reflexes that cover the object to be detected and makes it hard for analytics software to find and analyse the object in the IR-image. The present disclosure aims to provide methods, systems, devices and software to be used for background light subtraction in such scenarios, and in particular in scenarios where the objects to be detected moves in the scene or when the camera capturing the scene moves.

Figure 1:
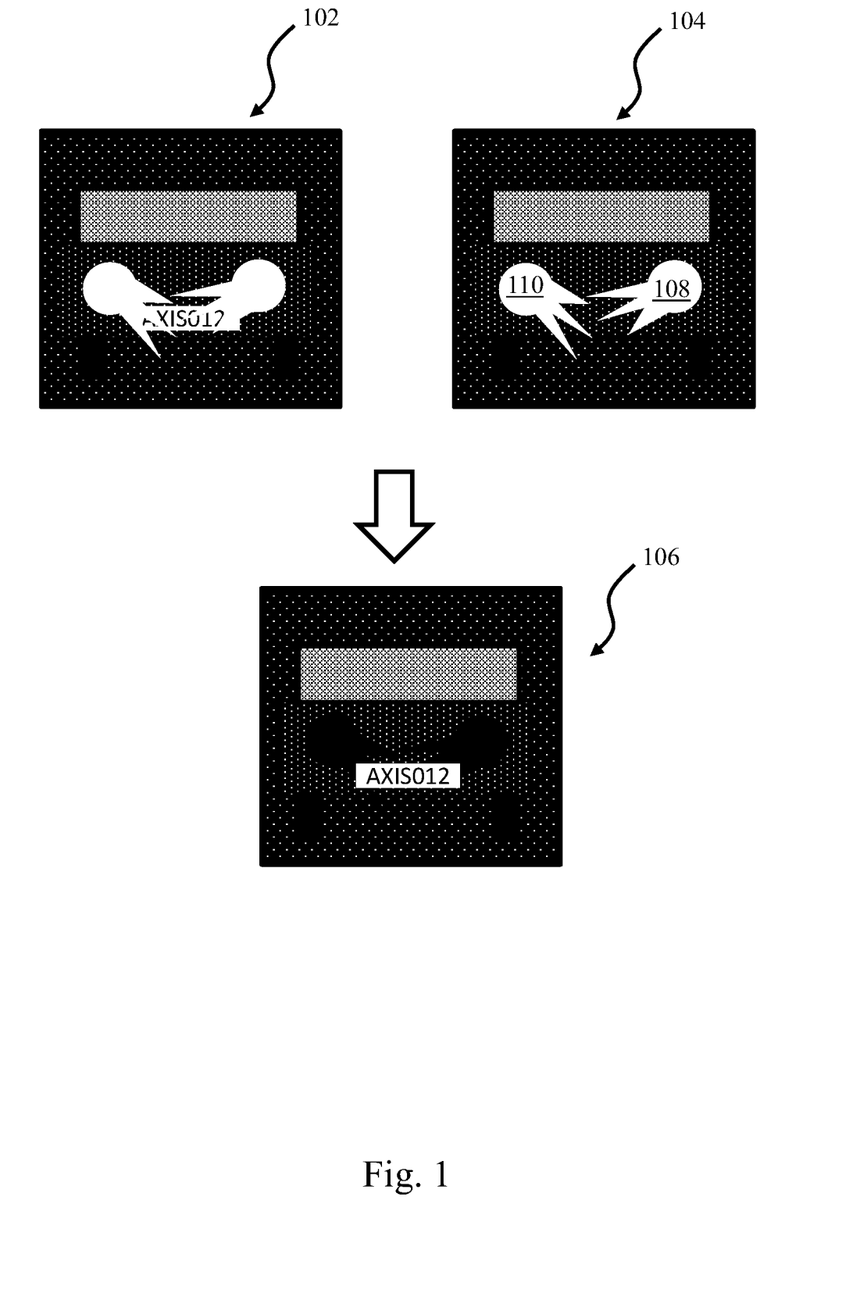
FIG. 1 shows an example scenario where a modified IR-illuminated image is created by subtracting background light from an IR-illuminated image using pixel values in a non-IR-illuminated image, FIG. 2 schematically shows capturing of two images interleaved in time using a rolling shutter image sensor and modulated IR-light, FIG. 3 schematically shows capturing of three images interleaved in time using a rolling shutter image sensor and modulated IR-light, FIG. 4 schematically shows modulation of IR-light, lines of pixels in a first and second image exposed with IR-light on, off, or with both IR-light on and off, and how this affects the modified IR-illuminated image, FIG. 5 schematically shows modulation of IR-light, lines of pixels in a first, second and third image exposed with IR-light on, off, or with both IR-light on and off, and how this affects the modified IR-illuminated image, FIG. 6 schematically shows a system including a rolling shutter sensor and an IR-light configured to be turned on and off, FIG. 7 schematically shows a method for performing background light subtraction in an IR illuminated image depicting a scene.

FIG. 1 schematically shows such a low light scenario comprising a vehicle with headlights and a license plate. In FIG. 1, an IR-illuminated image 102 and a non-IR-illuminated image 104 have been created as discussed above and further below in conjunction with FIGS. 2-7. As can be seen in FIG. 1, the headlights in the IR-illuminated image 102 reduces the visibility of the license plate, e.g., due to scattering and/or reflexes resulting from the headlights being directed into the camera capturing the IR-illuminated image 102. Advantageously, pixel values from the non-IR-illuminated image 104, may be used to subtract the disturbing light from the IR-illuminated image 102 such that the license plate may be readily detected and analysed. In FIG. 1, a modified IR-illuminated image 106 is shown, in which background light from the IR-illuminated image 102 has been subtracted using pixel values in the non-IR-illuminated image 104. In the modified IR-illuminated image 106, the license plate is clearly detectable and may be analysed to detect the registration identifier (AXIS 1) which is the alphanumeric ID that uniquely identifies the vehicle or the vehicle owner.

In some embodiments, the pixel values from the entire non-IR-illuminated image 104 (e.g., all pixels in the non-IR-illuminated image 104) is used for subtraction of the background light in the IR-illuminated image. In other embodiments, a sub-set of pixel coordinates is determined from the non-IR-illuminated image such that background light subtraction only is applied to a corresponding sub-set of pixels in the IR-illuminated image 102 when creating the modified IR-illuminated image 106. The sub-set of pixel coordinates in the non-IR-illuminated image 104 may be determined based on an analysis of luminosity of the pixel values in the non-IR-illuminated image 104, such that a coordinate of a pixel is included in the sub-set of pixel coordinates in case the luminosity of the pixel exceeds a threshold value. Limiting the set of pixels used for background subtractions may reduce the noise added to the modified IR-illuminated image 104 due to the subtraction operation. The concept of selecting a sub-set of pixel coordinates for subtraction is exemplified in FIG. 1 wherein the coordinates of the pixel data 108, 110 corresponding to the headlights and glares from the headlights in the non-IR-illuminated image 104 may be included in the sub-set. It should be noted that this sub-set of pixel coordinates 108, 110 is used as an example for ease of explanation of the concept of selecting pixel coordinates based on the luminosity value.

In some examples, the pixel values may be weighted with a weight value (e.g., between 0-1, such as 0.1, 0.5, 0.9, etc.) before being used for subtraction of background light. Subtracting a fraction (such as 10%, 50%, 90%, etc.) of the background light from the non-IR-illuminated image 104 may result in that less noise is added to the modified IR-illuminated image compared to the case where the full pixel values of the non-IR-illuminated image is subtracted.

In some embodiments, the non-IR-illuminated image 104 and the IR-illuminated image 102 is captured using the same colour space. In these cases, subtraction may be performed directly using element-wise arithmetic, e.g., by subtracting the RGB values of a pixel in the non-IR-illuminated image 104 from the RBG values of the corresponding pixel in the IR-illuminated image 102. In other embodiments, one or both of the non-IR-illuminated image 104 and the IR-illuminated image 102 is converted to another colour space before performing the subtraction, for example to the LAB colour space such that the L channel of the non-IR-illuminated image 104 is subtracted from the from the L channel of the IR-illuminated image 102. The resulting modified IR-illuminated image 106 may or may not be transformed back to the original colour space of the IR-illuminated image 102. In case the non-IR-illuminated image 104 and the IR-illuminated image 102 is captured using different colour space, the subtraction may be achieved by converting one or both to a different colour space prior to subtracting. For example, in case the IR-illuminated image 104 is a grayscale image and the non-IR-illuminated image 104 is a RGB image, the following steps may be performed:

Convert the RGB image 104 to the LAB colour space, which separates the luminosity (L) from the colour (a and b) dimensions of the image.

Extract the L channel from the LAB image, which contains the luminosity information.

Subtract the L-channel values from the pixel values of the grayscale image 104 using element-wise arithmetic Any other suitable transformations and/or scaling of one or both of the non-IR-illuminated image 104 and the IR-illuminated image 102 may be performed before performing the subtraction.

To be able to use the non-IR-illuminated image 104 and the IR-illuminated image 102 for performing the subtraction in a scenario in which the vehicle moves while being captured by a camera, or in a scenario in which the camera moves while capturing the images, the non-IR-illuminated image 104 and the IR-illuminated image 102 is advantageously captured close in time. This may be achieved using a rolling shutter image sensor which supports capturing two or more images with a smaller time difference compared to the readout time of the full sensor (e.g., first capturing the non-IR-illuminated image 104 and then the IR-illuminated image 102 or the other way around). The rolling shutter image sensor supports an interleaved configuration which now will be described in conjunction with FIG. 2.

Figure 2:
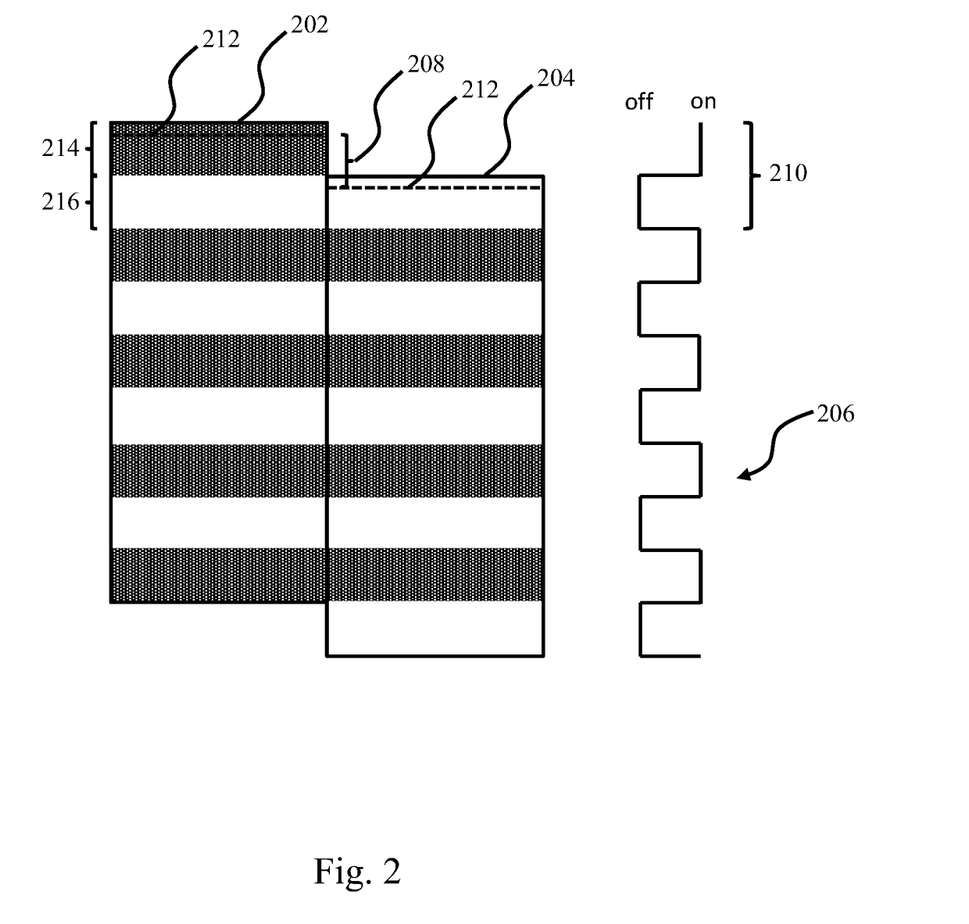

FIG. 2 schematically shows capturing of two image frames interleaved in time using a rolling shutter image sensor and modulated IR light source.

The rolling shutter image sensor is configured such that, during capture of an image, it reads out pixel data from one line of pixels at a time. Consequently, by modulating the IR light source such that it changes an on-off status 206 a plurality of times while capturing an image with the rolling shutter image sensor, each of the image frames will comprise a first set of lines of pixels 214 (in dark colour in FIG. 2) comprising image data captured with the IR light turned on, and a second set of lines of pixels 216 (in white colour in FIG. 2) comprising image data captured with the IR light turned off. Advantageously, an IR-illuminated image (ref 102 in FIG. 1) may be created based at least in part on the first set of lines 214 of the two image frames 202, 204, and a non-IR-illuminated image 104 may be created based at least in part on the second set of lines 216 of the two image frames 202, 204. Both images 202, 204 contains a pattern of lines of pixels captured with the IR-light off (bright stripes) and lines of pixels captured with the IR-light on (dark stripes), due to a rolling shutter read-out pattern in combination with blinking IR-light. By setting a time difference 208 between the first image frame 202 and the second image frame 204 to the same, or a multiply of, (substantially) half a time span, tspan, 210 of an on-off cycle of the IR light, the patterns in the two image frames 202, 204 will be out of phase. In other words, a first line of pixels 212 of the first image frame 202 will be read out at a first point in time t, and the corresponding first line of pixels 212 of the second image frame 204 will be read out at a second point in time $$t + \frac{t_{span}}{2}.$$

In FIG. 2, the IR light source is modulated with a square wave 206 (ON/OFF) where half the period of the wave corresponds to the time difference 208 between the two frames. In examples, tspan 210 may be at least 2 times the exposure time of any line of pixels in the two or more image frames.

Figure 4:
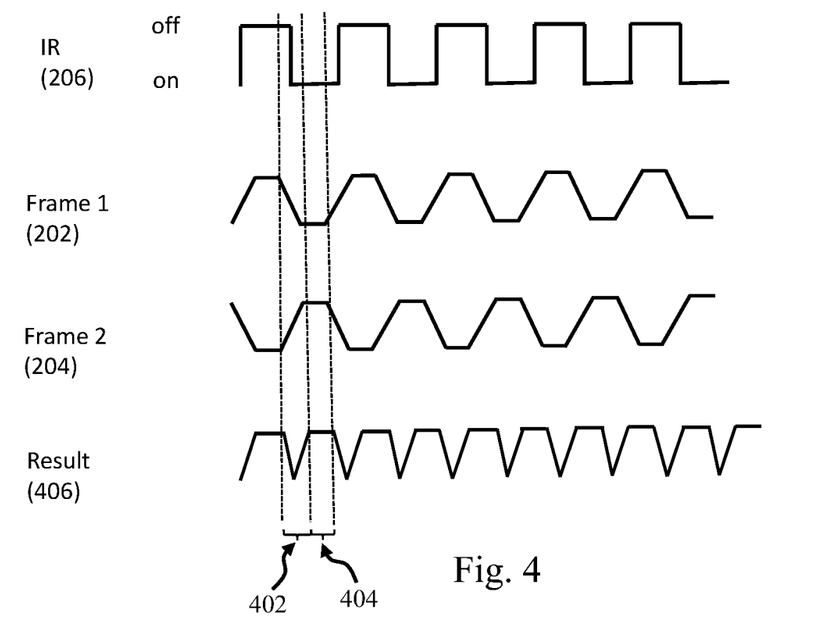

In an example scenario, the on-off cycle of the IR light, tspan, is between 1-2 ms, shutter time (exposure time) of the rolling image shutter sensor is 0.5 ms, and row time (the difference in time between the beginning exposure of neighbouring rows/lines of pixels) is 0.015 ms. Other configurations are equally possible. A short row time is advantageous since this will result in less distortion of moving objects in each image frame 202, 204 captured by the rolling shutter image sensor. However, since the shutter time is not indefinitely short, and the row time typically is shorter than the shutter time, some of the lines of pixels will be exposed with both IR-light on and off. This is illustrated in FIG. 4. The lines of pixels read out during time span 402 in both the first image frame 202 and the second image frame 204 are exposed with both IR-light 206 being on and off. The number of lines of pixels read out during time span 402 corresponds to the ratio between the shutter time and the row time. The lines of pixels read out during time span 404 in both the first image frame 202 and the second image frame 204 are exposed with only IR on or off.

Consequently, as schematically illustrated in FIG. 4 as the "Result" 406, an IR-illuminated image (or non-IR-illuminated image) created from the two captured image frames 202, 204 will include lines of pixels which are exposed with both IR-light on and off, e.g., during the time span 402. This may still suffice to perform the subtraction to create the modified IR-illuminated image as described in conjunction with FIG. 1. However, stripes of image data which may reduce quality of e.g., image analysis of the modified IR-illuminated image will occur in the modified IR-illuminated image in the two-image setup as shown in FIG. 2 and FIG. 4.

This problem may be solved using a three-image setup as now will be described in conjunction with FIG. 3 and FIG. 5. The three-image setup may allow for the modulation frequency of the IR-light to be matched with the time differences between the first, second and third image frames such that is always one image frame among the three image frames which has 100% IR-light on at every row of the image. Correspondingly, one image frame among the three image frames which has 100% IR-light off at every row of the image will exist.

Figure 3:
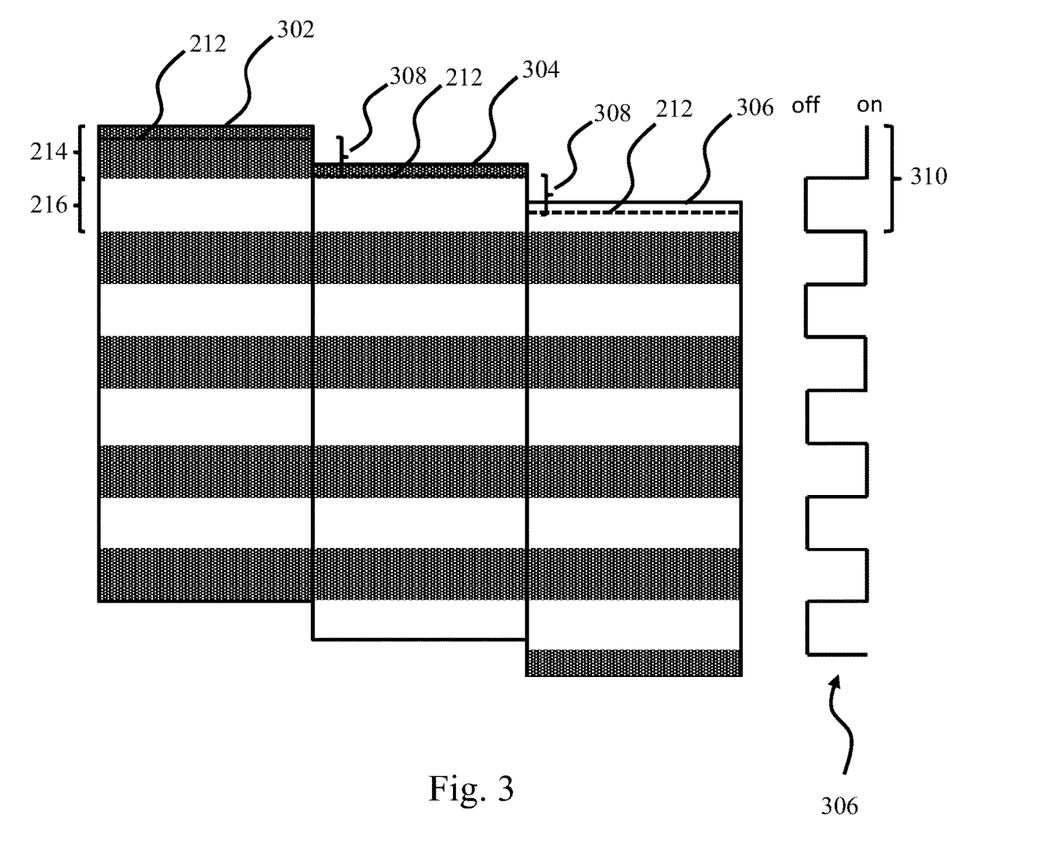

FIG. 3 schematically shows capturing of three image frames 302, 304, 306 interleaved in time using a rolling shutter image sensor and modulated IR light source. The rolling shutter image sensor thus supports a three-frame-interleaved mode.

Similar as was described above in conjunction with FIG. 2, the IR light source is modulated such that it changes an on-off status 306 a plurality of times while capturing an image with the rolling shutter image sensor, each of the image frames will comprise a first set of lines of pixels 214 (in dark colour in FIG. 3) comprising image data captured with the IR light turned on, and a second set of lines of pixels 216 (in white colour in FIG. 3) comprising image data captured with the IR light turned off. Advantageously, an IR-illuminated image (ref 102 in FIG. 1) may be created based at least in part on the first set of lines 214 of the three image frames 302, 304, 306 and a non-IR-illuminated image (ref 104 in FIG. 1) may be created based at least in part on the second set of lines 216 of the three image frames 302, 304, 306.

By setting a time difference 308 between the first image 302 and the second image 304, and between the second image 304 and the third image 306, to the same, or a multiply of, (substantially) ⅓ of a time span, tspan_2, 310 of an on-off cycle of the IR light, any lines of pixels which are exposed with both IR-light on and off may be avoided in the non-IR-illuminated image and the IR-illuminated image. Put differently, in the embodiment of FIG. 3, the rolling shutter image sensor is reading out a first line of pixels 212 for the first image frame 302 at a first point in time, t. For the second image frame 304, the rolling shutter image sensor is reading out the first line of pixels 212 at $$t + \frac{t_{span\_2}}{3},$$

and for the third image frame 306 the rolling shutter image sensor is reading out the first line of pixels 212 at $$t + \frac{2 \times t_{span\_2}}{2}.$$

This is then repeated for each line of pixels in the three image frames 302, 304, 306. In some examples, $t_{span\_2}$ may be at least 6 times the shutter time to avoid lines of pixels in each image frame are exposed with both IR-light 306 being on and off.

Figure 5:
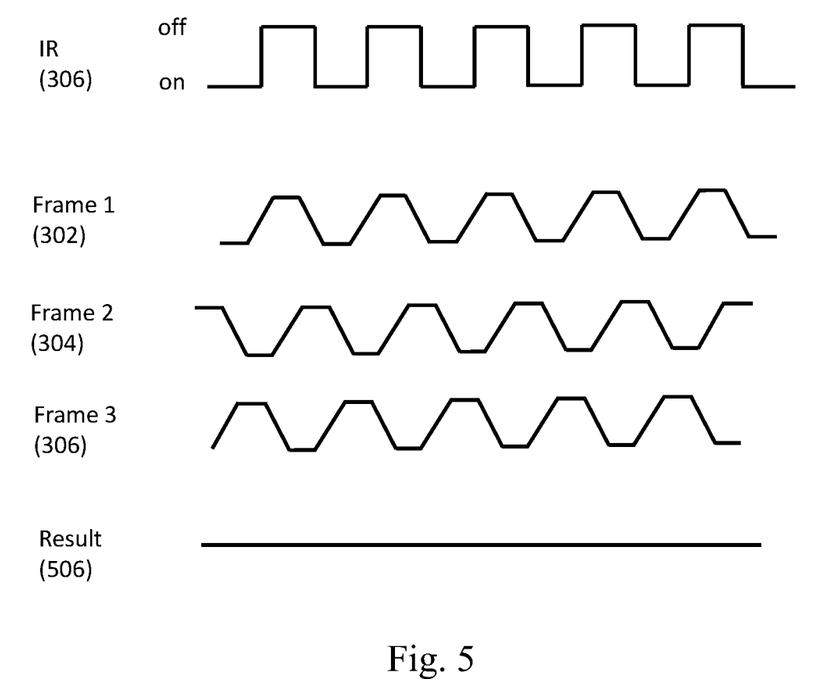

The result is schematically shown in FIG. 5. Similar to what was described in conjunction with FIG. 4 above, some lines of pixels in each image frame are exposed with both IR-light 306 being on and off. However, by capturing three image frames 302, 304, 306 with the time difference between the first image 302 and the second image 304, and between the second image 304 and the third image 306, to the same, or a multiply of, (substantially) ⅓ of a time span of an on-off cycle of the IR light 306, these lines of pixels may be avoided in the Result 506. The Result 506 thus represent an IR-illuminated image (or non-IR-illuminated image) created from the three captured image frames 302, 304, 306 and may not include any lines of pixels that are exposed with both IR-light on and off.

Figure 6:
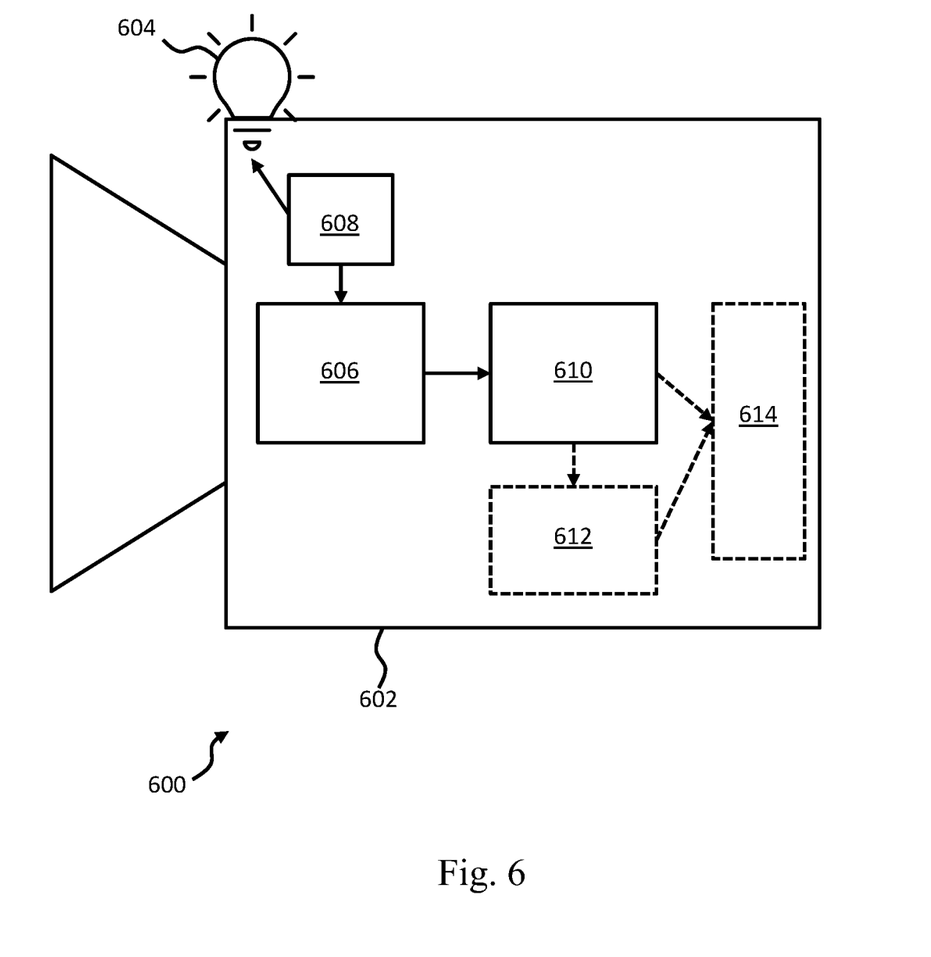

FIG. 6 schematically shows by way of example a system 602 adapted to perform background light subtraction in an IR illuminated image depicting a scene. The functionality of the system will now be described in conjunction with FIG. 7.

Figure 7:
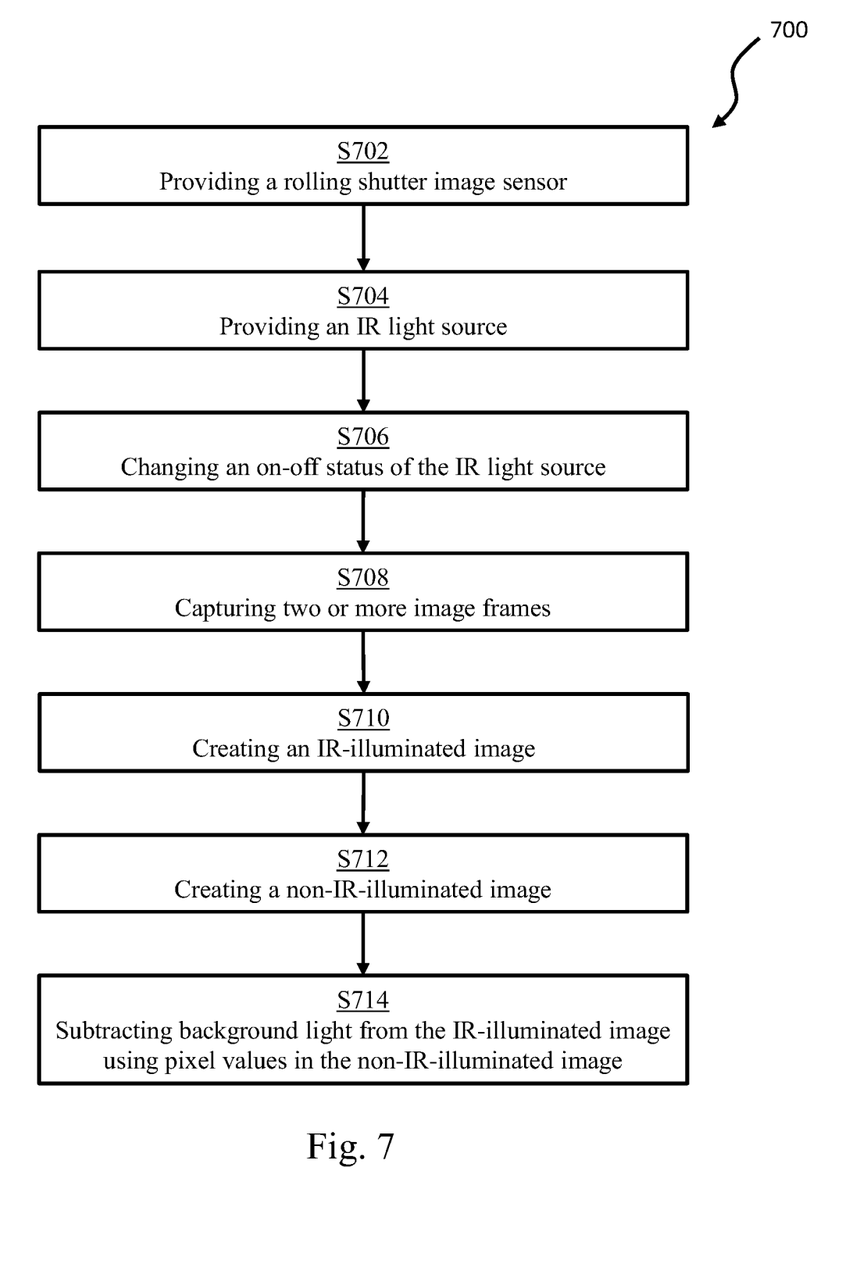

The system 602 comprises a rolling shutter image sensor 606 with a plurality lines of pixels, wherein the rolling shutter image sensor during capture of an image reads out pixel data from one line of pixels at a time. The rolling shutter image sensor 606 is thus provided S702.

The system 602 further comprises an IR light source 604 configured to be turned on and off, wherein when being turned on, the IR light is configured to illuminate the scene. The IR light is thus provided S704. IR is electromagnetic radiation (EMR) with wavelengths longer than those of visible light. It is therefore invisible to the human eye. IR is generally understood to encompass wavelengths from around 1 millimetre (300 GHZ) to the nominal red edge of the visible spectrum, around 700 nanometres (430 THz). Infrared light sources may be used to augment the available ambient light for conversion by night vision devices, increasing in-the-dark visibility without actually using a visible light source. In some embodiments, the IR light source, and thus the method 700 shown in FIG. 7, is only used when a determined luminosity value of natural light in the scene does not exceed a threshold luminosity. Any type of light sensor (e.g., a light meter, a lux meter, or a photometer) may be used to determined luminosity value of natural light in the scene. The threshold luminosity may be configured based on the use case and the parameters of the rolling shutter image sensor. The threshold luminosity may be set to e.g., 2 lux, 1 lux, 0.5 lux, etc.

Any suitable IR light source 604 may be used, such as bulbs, lamps or diodes.

The system 602 further comprises an IR light controlling unit 608 configured to change S706 an on-off status of the IR light a plurality of times while capturing an image with the rolling shutter image sensor.

The rolling shutter image sensor 606 is configured for capturing S708 two or more image frames (as exemplified in FIGS. 2-3), wherein the rolling shutter image sensor being configured to read out image data to the two or more image frames interleaved in time. Consequently, each image frame will comprise a first set of lines of pixels comprising image data captured with the IR light turned on and a second set of lines of pixels comprising image data captured with the IR light turned off.

The system 602 further comprises an image stitching unit 610 configured to create S710 (e.g., crop and stitch), as exemplified in FIG. 4-5, an IR-illuminated image based at least in part on the first set of lines of the two or more image frames and to create S712 a non-IR-illuminated image based at least in part on the second set of lines of the two or more image frames. The image stitching unit 610 may further be configured to subtract S714 background light from the IR-illuminated image using pixel values in the non-IR-illuminated image, thereby creating a modified IR-illuminated image (as shown in FIG. 1 as reference 106).

In some embodiments, the system 602 further comprises an image analysis unit 612 configured to detect a license plate in the modified IR illuminated image. The rolling shutter image sensor may be provided in a camera 600 capturing a scene comprising a road.

In some embodiments, the system 602 further comprises a wireless transmitter 614. It can be used to transmit data such as the modified IR-illumined image or any detected license plates or other data from analysing the modified IR-illumined image. The data may be transmitted for storage, or further analysis at a server. The data may be received by a human operator trained to act on the data.

The system 602 may in examples be implemented in a single device such as a camera 600. In other examples, some or all of the different components (modules, units, etc.) 606, 608, 610, 612, 614 may be implemented in a server or in the cloud. Generally, the device (camera, server, etc.) implementing the components 606, 608, 610, 612, 614 may comprise circuitry which is configured to implement the components 606, 608, 610, 612, 614 and, more specifically, their functionality. The described features in the system 602 can be implemented advantageously in one or more computer programs that are executable on a programmable system including at least one programmable processor coupled to receive data and instructions from, and to transmit data and instructions to, a data storage system, at least one input device such as a camera, and at least one output device such as a display. Suitable processors for the execution of a program of instructions include, by way of example, both general and special purpose microprocessors, and the sole processor or one of multiple processors or cores, of any kind of computer. The processors can be supplemented by, or incorporated in, ASICs (application-specific integrated circuits).

The above embodiments are to be understood as illustrative examples of the disclosure. Further embodiments of the disclosure are envisaged. For example, the image analysis unit 612 may be configured to detect road signs. The output from the image analysis unit may be used to control a vehicle that the camera 600 is mounted to. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A method of performing background light subtraction in an infra-red (IR) illuminated image depicting a scene, the method comprising:
providing a rolling shutter image sensor with a plurality lines of pixels, wherein the rolling shutter image sensor during capture of an image reads out pixel data from one line of pixels at a time;
providing an IR light source configured to be turned on and off, wherein when being turned on, the IR light is configured to illuminate the scene;

changing an on-off status of the IR light source a plurality of times while capturing an image with the rolling shutter image sensor;

capturing three image frames using the rolling shutter image sensor, the three image frames being captured in a chronological order and comprising a first image frame in chronological order and a last image frame in a chronological order, the rolling shutter image sensor being configured to read out image data to the three image frames interleaved in time, such that read-out of a first line of pixels for the last image frame is performed prior to read-out of a last line of pixels to the first image frame, each image frame comprising:

a first set of lines of pixels exposed only with the IR light turned on;

a second set of lines of pixels exposed only with the IR light turned off;

a third set of lines of pixels exposed with the IR light turned both on and off;

creating an IR-illuminated image using only first set of lines of the three frames;

creating a non-IR-illuminated image using only the second set of lines of the three image frames;

subtracting background light from the IR-illuminated image using pixel values in the non-IR-illuminated image, thereby creating a modified IR-illuminated image, wherein the step of changing an on-off status of the IR light comprises completing an on-off cycle of the IR light during a second time span, tspan 2, wherein the IR light is turned on during a first half of the second time span and turned off during a second half of the second time span and wherein $$\frac{t_{span}}{2} => 3$$

times the exposure time of any line of pixels in the three image frames;

wherein the step of capturing three image frames comprises:

capturing a first image frame, a second image frame and a third image frame;

reading out, by the rolling shutter image sensor, a first line of pixels for the first image frame at a first point in time, t;

reading out, by the rolling shutter image sensor, the first line of pixels for the second image frame at $$t + x * \left(\frac{t_{span\_2}}{3}\right);$$

and reading out, by the rolling shutter image sensor, the first line of pixels for the third image frame at $$t + y * \left(\frac{2 \times t_{span\_2}}{3}\right);$$

wherein x and y are positive natural numbers.

2. The method of claim 1, wherein the step of subtracting comprises, for each pixel coordinate of at least a sub-set of pixel coordinates in the non-IR-illuminated image, subtracting the pixel value at the pixel coordinate in the non-IR-illuminated image from the pixel value at a corresponding pixel coordinate in of the IR-illuminated image.

3. The method of claim 2, further comprising the step of selecting the sub-set of pixel coordinates based on luminosity of the pixel values in the non-IR-illuminated image.

4. The method of claim 1, wherein the step of subtracting comprises, for each pixel coordinate of at least a sub-set of pixel coordinates in the non-IR-illuminated image, multiplying the pixel value at the pixel coordinate in the non-IR-illuminated image with a weight value, and subtracting the weighted pixel value at the pixel coordinate in the non-IR-illuminated image from the pixel value at a corresponding pixel coordinate in the IR-illuminated image.

5. The method of claim 1, comprising an initial step of determining a luminosity value of natural light in the scene, wherein, upon determining that the luminosity value exceeds a threshold luminosity, the method is aborted, and upon determining that the luminosity value not exceeding a threshold luminosity, the method is continued.

6. The method of claim 1, wherein the rolling shutter image sensor is configured to have a same exposure time for all lines of pixels.

7. The method of any one of claim 1, further comprising the step of:

detecting a license plate in the modified IR illuminated image.

8. The method of claim 1, wherein the rolling shutter image sensor is provided in a camera capturing a scene comprising a road.

9. A system comprising:

a rolling shutter image sensor with a plurality lines of pixels, wherein the rolling shutter image sensor during capture of an image reads out pixel data from one line of pixels at a time;

an IR light configured to be turned on and off, wherein when being turned on, the IR light is configured to illuminate the scene;

an IR light controlling unit configured to changing an on-off status of the IR light a plurality of times while capturing an image with the rolling shutter image sensor;

wherein the rolling shutter image sensor being configured for capturing three image frames, the three image frames being captured in a chronological order and comprising a first image frame in chronological order and a last image frame in a chronological order, wherein the rolling shutter image sensor being configured to read out image data to the three image frames interleaved in time, such that read-out of a first line of pixels for the last image frame is performed prior to read-out of a last line of pixels to the first image frame, each image frame comprising:

a first set of lines of pixels exposed only with the IR light turned on;

a second set of lines of pixels exposed only with the IR light turned off;

a third set of lines of pixels exposed with the IR light turned both on and off;

wherein the device further comprising an image stitching unit configured to:

create an IR-illuminated image using only the first set of lines of the three image frames;

create a non-IR-illuminated image using only the second set of lines of the three frames; and subtract background light from the IR-illuminated image using pixel values in the non-IR-illuminated image, thereby creating a modified IR-illuminated image wherein the IR light controlling unit is configured to complete an on-off cycle of the IR light during a second time span, $t_{span\_2}$, wherein $$\frac{t_{span}}{2} => 3$$

times the exposure time of any line of pixels in the three image frames, wherein the IR light is turned on during a first half of the second time span and turned off during a second half of the second time span;

wherein the rolling shutter image sensor being configured for:

capturing a first image frame, a second image frame and a third image frame;
reading out a first line of pixels for the first image frame at a first point in time, t;
reading out the first line of pixels for the second image frame at $$t + x * \left(\frac{t_{span\_2}}{3}\right);$$

and reading out the first line of pixels for the third image frame at $$t + y * \left(\frac{t_{span\_2}}{3}\right);$$

wherein x and y are positive natural numbers.

10. The system of claim 9, further comprising:
an image analysis unit configured to detect a license plate in the modified IR illuminated image.

11. A non-transitory computer-readable storage medium having stored thereon instructions for implementing a method of performing background light subtraction in an infra-red (IR) illuminated image depicting a scene, when executed on a device having processing capabilities, the method comprising:

providing a rolling shutter image sensor with a plurality lines of pixels, wherein the rolling shutter image sensor during capture of an image reads out pixel data from one line of pixels at a time;
providing an IR light source configured to be turned on and off, wherein when being turned on, the IR light is configured to illuminate the scene;
changing an on-off status of the IR light source a plurality of times while capturing an image with the rolling shutter image sensor;
capturing three image frames using the rolling shutter image sensor, the three image frames being captured in a chronological order and comprising a first image frame in chronological order and a last image frame in a chronological order, the rolling shutter image sensor being configured to read out image data to the three image frames interleaved in time, such that read-out of a first line of pixels for the last image frame is performed prior to read-out of a last line of pixels to the first image frame, each image frame comprising:
a first set of lines of pixels exposed only with the IR light turned on;
a second set of lines of pixels exposed only with the IR light turned off;
a third set of lines of pixels exposed with the IR light turned both on and off;
creating an IR-illuminated image using only first set of lines of the three frames;
creating a non-IR-illuminated image using only the second set of lines of the three image frames;
subtracting background light from the IR-illuminated image using pixel values in the non-IR-illuminated image, thereby creating a modified IR-illuminated image,
wherein the step of changing an on-off status of the IR light comprises completing an on-off cycle of the IR light during a second time span, $t_{span\_2}$,
wherein the IR light is turned on during a first half of the second time span and turned off during a second half of the second time span and wherein $$\frac{t_{span}}{2} => 3$$

times the exposure time of any line of pixels in the three image frames;

wherein the step of capturing three image frames comprises:

capturing a first image frame, a second image frame and a third image frame;
reading out, by the rolling shutter image sensor, a first line of pixels for the first image frame at a first point in time, t;
reading out, by the rolling shutter image sensor, the first line of pixels for the second image frame at $$t + x * \left(\frac{t_{span\_2}}{3}\right);$$

reading out, by the rolling shutter image sensor, the first line of pixels for the third image frame at $$t + y * \left(\frac{2 \times t_{span\_2}}{3}\right);$$

wherein x and y are positive natural numbers.

12. The method of claim 1, wherein x=1 and y=1.

* * * * *